(12) United States Patent
Chludek

(10) Patent No.: US 7,585,246 B2
(45) Date of Patent: Sep. 8, 2009

(54) DIFFERENTIAL CARRIER WITH AN INCREASED STRENGTH

(75) Inventor: Adrian Chludek, St. Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 330 days.

(21) Appl. No.: 10/576,840

(22) PCT Filed: Oct. 18, 2004

(86) PCT No.: PCT/EP2004/011717

§ 371 (c)(1),
(2), (4) Date: Dec. 28, 2006

(87) PCT Pub. No.: WO2005/040643

PCT Pub. Date: May 6, 2005

(65) Prior Publication Data

US 2007/0167271 A1 Jul. 19, 2007

(30) Foreign Application Priority Data

Oct. 20, 2003 (DE) ................................ 103 48 547

(51) Int. Cl.
 *F16H 48/20* (2006.01)
(52) U.S. Cl. .................... 475/233; 475/88; 475/239; 74/607; 192/54.52; 192/93 A; 192/103 F
(58) Field of Classification Search ............. 475/88, 475/230, 231, 233, 238, 239; 74/607; 192/35, 192/54.52, 93 A, 103 F, 84.7
See application file for complete search history.

(56) References Cited

U.S. PATENT DOCUMENTS

| 4,445,400 A | * | 5/1984 | Sullivan et al. ............... 475/88 |
| 4,893,525 A | | 1/1990 | Gabor |
| 4,950,214 A | | 8/1990 | Botterill |
| 5,031,743 A | | 7/1991 | Morishita et al. |
| 5,087,228 A | * | 2/1992 | Johansson .................... 475/88 |
| 5,556,343 A | | 9/1996 | Gassmann et al. |
| 5,611,746 A | * | 3/1997 | Shaffer ........................ 475/88 |
| 5,690,201 A | | 11/1997 | Gassmann |
| 5,924,948 A | | 7/1999 | Kwoka |
| 5,979,624 A | | 11/1999 | Chludek |

(Continued)

FOREIGN PATENT DOCUMENTS

DE 34 02 917 C1 2/1985

(Continued)

*Primary Examiner*—David D. Le
(74) *Attorney, Agent, or Firm*—Rader, Fishman & Grauer, PLLC

(57) ABSTRACT

A differential carrier is disclosed containing sideshaft gears supported in the carrier so as to be coaxially rotatable around a longitudinal axis (A). Differential gears are supported in the carrier on axes of rotation (R) positioned radially relative to the longitudinal axis (A) and have teeth engaging those of the sideshaft gears, and a multi-plate coupling in the carrier to extend coaxially relative to the axis. The carrier includes a flange to which a ring gear can be bolted, and is formed of a dish-shaped part with a base and an integrally formed-on flange and a cover which is axially fixed by an annular securing element. The multi-plate coupling and the cover are positioned in the carrier on the side located opposite the flange and the base.

16 Claims, 3 Drawing Sheets

U.S. PATENT DOCUMENTS

| | | |
|---|---|---|
| 6,296,590 B1 | 10/2001 | Gassmann |
| 6,571,928 B1 | 6/2003 | Gassmann |
| 6,592,487 B2 | 7/2003 | Gassmann |
| 6,805,653 B2 * | 10/2004 | Krzesicki et al. ............ 475/233 |
| 7,000,492 B2 | 2/2006 | Hulsebusch |
| 2002/0077212 A1 * | 6/2002 | Krisher ...................... 475/231 |
| 2003/0096670 A1 | 5/2003 | Hunt |

FOREIGN PATENT DOCUMENTS

| | | |
|---|---|---|
| DE | 199 42 044 C1 | 6/2001 |
| DE | 102 52 974 A1 | 11/2002 |

* cited by examiner

DIFFERENTIAL CARRIER WITH AN INCREASED STRENGTH

TECHNICAL FIELD

The invention relates to a differential carrier for a differential drive, which differential carrier has to be supported so as to be rotatingly drivable around its longitudinal axis A, with sideshaft gears which are supported in the differential carrier so as to be coaxially rotatable around the longitudinal axis A, with differential gears which are supported in the differential carrier on axes of rotation R positioned radially relative to the longitudinal axis A and which meshingly engage the sideshaft gears, and with a multi-plate coupling which is arranged in the differential carrier so as to extend coaxially relative to the longitudinal axis A and which is arranged so as to be effective between a first one of the sideshaft gears on the one hand and the differential carrier or the second one of the sideshaft gears on the other hand, wherein the differential carrier comprises a flange to which a crown gear can be bolted.

BACKGROUND

Differential drives can build up a locking effect via an externally controlled actuating device or vary a locking effect without any external influence, as a function of the differential speed or as a function of the transmitted torque. Such a self-locking differential drive is known from DE 34 02 917 C1 for example.

There are several types of prior art differential carriers which, substantially consist of a dish-shaped part and a cover part, with an assembly consisting of sideshaft gears and differential gears being accommodated in the rear part of the dish-shaped part, with the multi-plate coupling being arranged aside of same and, finally, with a cover with an integrally formed-on flange closing said assembly. In the case of differential drives with an externally controlled actuating device for actuating the multi-plate coupling, it is possible to arrange same inside the differential carrier, with the cover forming part of the actuating device (DE 199 42 044 C1) or being positioned outside the differential carrier, wherein the actuating device is supported on a sleeve projection at the cover part (U.S. Pat. No. 6,571,928). The disadvantage of these designs is that, as a result of the bearing region of the differential carrier being formed on to the cover, a centering error of the cover relative to the dish-shaped part affects the concentric running characteristics of the differential carrier and thus of the ring gear.

From U.S. Pat. No. 5,924,948, there is known a differential drive with a differential carrier. The differential carrier comprises a dish-shaped part with a base and with a flange as well as a cover which can be bolted to the flange. With reference to a plane extending through the axes of rotation of the differential gears, the base and the flange of the dish-shaped part are arranged on different sides. This also applies to the differential drives known from U.S. Pat. Nos. 6,592,487, 6,296,590 and 4,950,214.

U.S. Publication No. 2003/096670 proposes a differential drive with a dish-shaped differential carrier, and with reference to the central plane of the differential drive, a base and a flange of the dish-shaped differential carrier are jointly positioned on one side. On the opposite side, there is provided a cover which is placed on to the differential carrier and secured thereto by circumferentially distributed bolts.

SUMMARY OF THE INVENTION

The present invention provides a solution according to which the strength and the concentric running characteristics of the differential carrier can be improved.

The solution is that the differential carrier is formed of a dish-shaped part comprising a base and an integrally formed-on flange, and of a cover which is inserted into the dish-shaped part and which is axially fixed by an annular securing element. The cover and the multi-plate coupling—with reference to a plane extending through the axes of rotation of the differential gears—are positioned in the differential carrier on the side located opposite the base and the flange. More particularly, the flange substantially overlaps with the base of the dish-shaped part.

According to one embodiment, there is provided an actuating device for actuating the multi-plate coupling, which actuating device can be arranged inside or outside the differential carrier. If the actuating device is arranged inside the differential carrier, it can be provided in the form of a differential-speed-sensing device, more particularly a shear pump device of the Viscolok type. It is particularly advantageous that the housing of the shear pump device is at least partially formed by the cover of the differential carrier. In the case of an embodiment where the actuating device is arranged outside the differential carrier, the actuating device can be provided in the form of an externally controllable device, more particularly a ball ramp setting device. It is advantageous that the ball ramp setting device is supported on a projection at the dish-shaped part of the differential carrier. As an alternative to the embodiment with an actuating device, the differential carrier can also be used in a self-locking differential drive without an external actuating device.

The inventive differential carrier is advantageous in that the operation of machining the flange and the nearby bearing region for the differential carrier can take place in one clamping setting-up for the first part, so that concentric running errors of the ring gear are largely avoided. The play-free fit between the cover and the first part is further removed from the flange at the first part, so that any concentric running errors between said fit and the second bearing region for the differential carrier provided at the cover are transmitted to the assembly of the ring gear to a very limited extent only. By axially associating the flange and the base of the first dish-shaped part, the ring gear fixing acquires a very high degree of stability. Because the cover is inserted into the dish-shaped part and axially fixed by the annular securing element, the differential drive acquires a short axial length, and at the same time the dish-shaped part is adequately reinforced from the inside. Furthermore, using a securing element constitutes a cost-effective solution because there is no need for any additional components.

According to a first embodiment, the annular securing element is provided in the form of a threaded ring which is screwed into a corresponding inner thread in the dish-shaped part. The threaded ring comprises at least one circumferentially distributed bore which cuts into an outer circumferential face and into which there is pressed a securing element, for example a metal ball, to prevent rotation. To prevent the rotation of the threaded ring, it is also conceivable to apply any other solution such as welding or caulking. As an alternative to the threaded ring, the annular securing element can also be provided in the form of a circlip ring which is arranged in a corresponding annular groove in the dish-shaped part.

BRIEF DESCRIPTION OF THE DRAWINGS

Preferred embodiments of the invention are illustrated in the drawings which will be described below.

DETAILED DESCRIPTION

Figure 1:
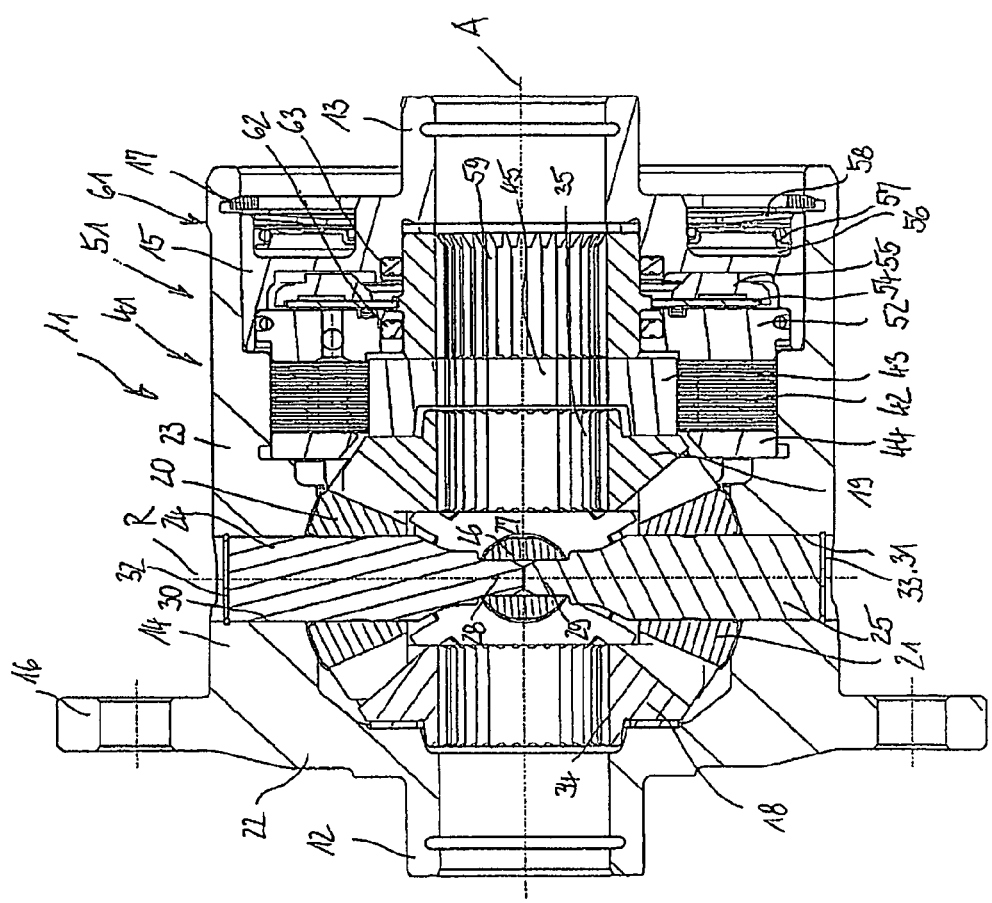
FIG. 1 shows an inventive differential carrier in a first embodiment.

FIG. 1 shows a differential carrier 11 which has to be rotatably supported in the housing of a differential drive. Support in this case is provided, more particularly, by two sleeve projections 12, 13 arranged coaxially relative to the longitudinal axis A of the differential carrier. The differential carrier comprises a dish-shaped first part 14 with a base 22, a casing 23 and an integrally formed-on flange 16 as well as a cover 15 inserted into the first part 14. A ring gear for rotatingly driving the differential carrier can be bolted to the flange 16. The first sleeve projection 12 is integrally connected to the first part 14 and the second sleeve projection 13 is integrally connected to the cover 15. By a securing ring 17, the cover 15 is held so as to be supported against a step in the dish-shaped first part 14. The securing ring 17 comprises an outwardly pointing conical face, so that the cover 15 is mounted in a play-free way in the first part 14. In the differential carrier 11 there are provided two output bevel gears 18, 19 arranged coaxially relative to the longitudinal axis A, and a number of (four) differential bevel gears whose axis of rotation is each positioned radially relative to the longitudinal axis A and of which two 20, 21 can be seen in this Figure. The teeth of the four differential bevel gears engage those of the two output bevel gears 18, 19 and are uniformly distributed around the circumference. The identifiable differential gears 20, 21 run slidingly on bearing arms 24, 25 which are inserted into radial bores 30, 31 in the first part 14 and held radially outwardly therein by securing rings 32, 33. By their inner ends 28, 29 whose diameter is reduced, the bearing arms 24, 25 are directly supported relative to one another. Said arms are laterally supported by a second pair of integrally produced arms 26, 27 and held relative to one another. The differential carrier 11 in the embodiment as shown here forms part of a lockable differential drive and comprises a multi-plate coupling 41 and a shear pump assembly 51 such as it is described in the applicant's publication U.S. Pat. No. 5,979,624, which is incorporated by reference herein. Therefore, only the most important details are mentioned. The assembly is filled with a fluid. The multi-plate coupling comprises a plate package 42 including first plates connected to the first part 14 in a rotationally fast way and of second plates connected to a coupling hub 43. The plate package is axially supported on a supporting disc 44 in the first part 14 if it is axially loaded by a setting piston 52 of the shear pump assembly 51. Furthermore, the shear pump 51 comprises a shear plate 54 connected to a pump hub 53 and a shear groove and control element 55 rotatable to a limited extent relative to the cover part 15 which, at the same time, forms the pump housing. In the cover part 15, there is formed a pump chamber 60 containing the shear plate 54 and the shear groove and control element 55. Furthermore, it is possible to identify in the cover part 15 a reservoir 61 which is formed by an annular chamber 56, an annular cover 57 and a plate spring 58 and which is connected by bores (not shown) to the pump chamber 60 of the shear pump 51. The output bevel gear 18 comprises inner teeth 34 into which it is possible to insert a first sideshaft. The output bevel gear 19 comprises second inner teeth 35 into which a second output shaft can be inserted. Inner teeth 45 of the coupling hub 43 and inner teeth 59 of the pump hub 53 correspond to the inner teeth 35 of the output bevel gear 19. The output bevel gear 19, the coupling hub 43 and the pump hub 53 are connected to one another in a rotationally fixed way by inserting a sideshaft. As a result, if there occurs a speed differential between the output bevel gear 19 and the differential carrier 11, a fluid pressure is built up in the shear pump 51 as a result of which the piston 52 is displaced against the plate package 42, so that the output bevel gear 19 is braked relative to the differential carrier 11. The piston 52 and the cover 15 are sealed relative to one another by seals 62, 63. Via sliding discs 36, 37, the output bevel gear 18 and the pump hub 53 are axially supported relative to the differential carrier 11 in a low-friction way.

Figure 2:
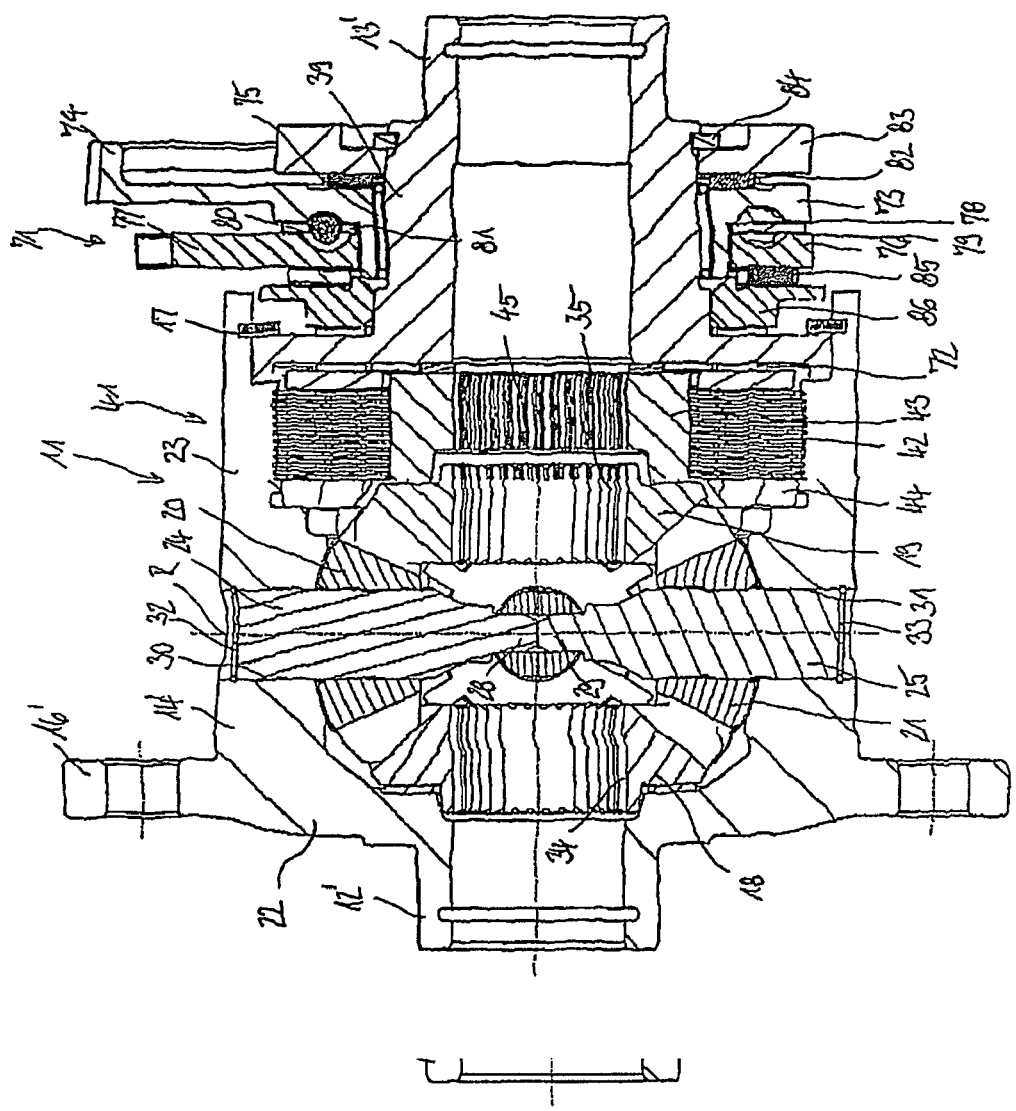
FIG. 2 shows an inventive differential carrier in a second embodiment.

FIG. 2 shows a differential carrier 11' which has to be rotatably supported in the housing of the differential drive. Support, in this case, is provided more particularly on two sleeve projections 12' 13' which are positioned coaxially relative to the longitudinal axis A of the differential carrier. The differential carrier comprises a dish-shaped first part 14' with a base 22', a casing 23' and an integrally formed-on flange 16' as well as a cover 15' inserted into the first part 14'. A ring gear for rotatingly driving the differential carrier can be bolted to the flange 16'. The first sleeve projection 12' is integrally connected to the first part 14' and the second sleeve projection 13' is integrally connected to the cover 15'. By a securing ring 17, the cover 15' is held in the dish-shaped part 14 in an axially play-free way. In the differential carrier there are provided two output bevel gears 18, 19 arranged coaxially relative to the longitudinal axis A, and a number of (four) differential bevel gears whose axis of rotation R is each positioned radially relative to the longitudinal axis A and of which two 20, 21 can be seen in this Figure. The teeth of the four differential bevel gears engage those of the two output bevel gears 18, 19 and are uniformly distributed around the circumference. The identifiable differential gears 20, 21 run slidingly on bearing arms 24, 25 which are inserted into radial bores 30, 31 in the first part 14 and held radially outwardly therein by securing rings 32, 33. By their inner ends 28, 29 whose diameter is reduced, the bearing arms 24, 25 are directly supported relative to one another. Said arms are laterally supported by a second pair of arms 26, 27 and held relative to one another. The differential carrier in the embodiment as shown here forms part of a lockable differential drive and comprises a multi-plate coupling 41 and a ramp disc assembly 71 such as it is described in the applicant's publication U.S. Pat. No. 7,000,492 for example, which is incorporated by reference herein. Therefore, only the most important details are mentioned. The multi-plate coupling comprises a plate package 42 including first plates connected to the first part 14 in a rotationally fixed way and of second plates connected to a coupling hub 43. The plate package 42 is axially supported on a supporting disc 44 in the first part 14 if it is axially loaded by pressure pins 72 of the ramp disc assembly 71. The supporting disc 44, in turn, is axially supported at the end of a recess in the first part 14. The ramp disc assembly 71 is arranged on a reinforced first portion 39 of the second sleeve projection 13'. It comprises a setting disc 73 which, via a needle bearing 75, is supported on the portion 39 and which is rotatingly adjustable via a tooth segment 74. Furthermore, it comprises a pressure disc 76 which, via a holding projection 77, can be secured in a housing in a rotationally fixed way. In those faces of the setting disc 73 and of the pressure disc 76 which face one another, there is arranged a plurality of ball grooves 78, 79 which extend along delimited circumferential regions whose depths vary in opposite directions. Each pair of ball grooves 78, 79 accommodates a ball 80. The balls are held at a constant distance from one another by a ball cage 81. The setting disc 73 is supported via an axial bearing 82 on a disc 83 which is held by a securing ring 84 on the portion 39. The pressure disc 76 is radially centred entirely by the balls 80 and acts on a pressure plate 86 via an axial bearing 85. Said pressure plate 86 loads the pressure pins 72. The output bevel gear 18 comprises inner teeth 34 into which a first sideshaft can be inserted; the output bevel gear 19 comprises second inner teeth 35 into which a second output shaft can be inserted. Inner teeth 45 of the coupling hub 43 correspond to the inner teeth 35. By inserting a sideshaft, the output bevel gear 19 and the coupling hub 43 are connected to one another in a rotationally fast way. The output bevel gear 18 and the coupling hub 43 are supported relative to the differential carrier via sliding discs 36, 37 in an axially low-friction way.

Figure 3B:
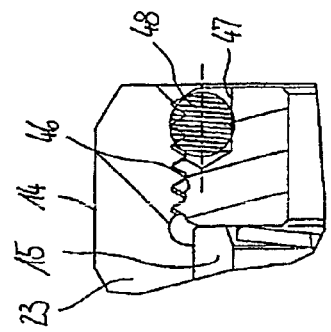
FIG. 3 shows an inventive differential carrier in a third embodiment:
A) in a longitudinal section; and
B) the securing element according to FIG. 3A in the form of a detail.
Figure 3A:
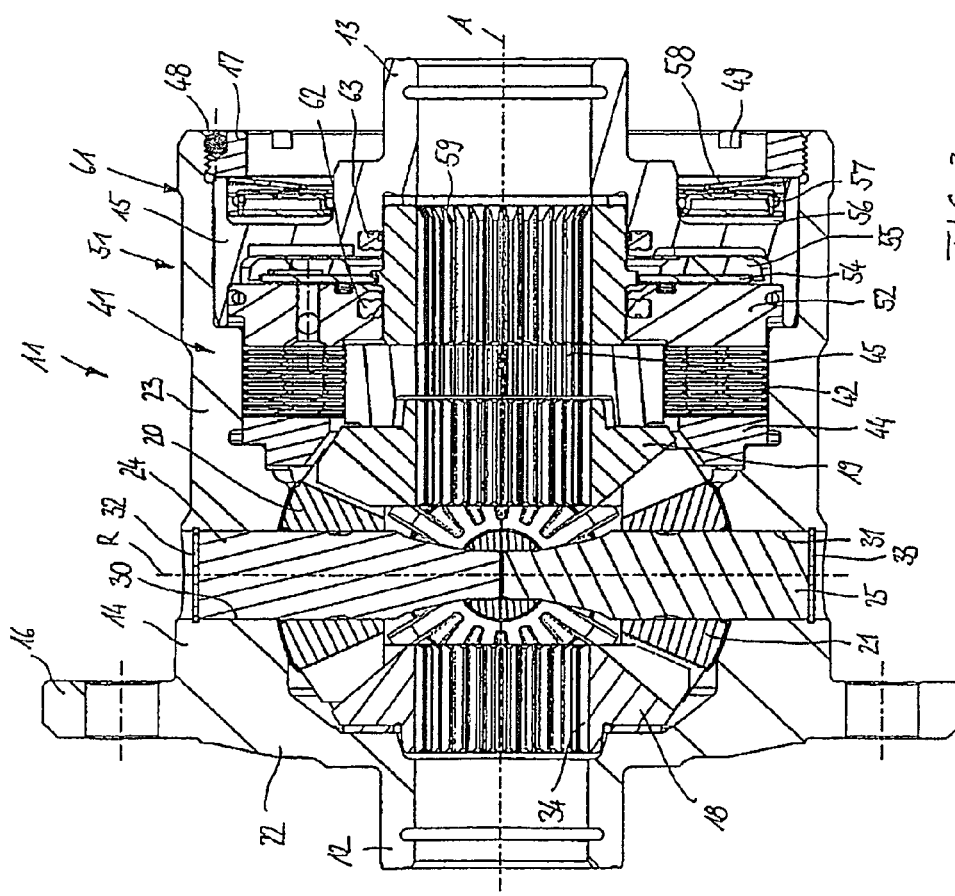

FIGS. 3a and 3b which will be described jointly below show a further differential carrier 11 which, in respect of design and functioning, corresponds to that shown in FIG. 1 to the description of which reference is hereby made. Identical components have been given the same reference numbers. The embodiment according to FIG. 3 is characterised in that the annular securing element 17, in this case, is provided in the form of a threaded ring which is threaded into a corresponding inner thread 46 of the dish-shaped first part 14 and rotationally secured relative thereto. To prevent rotation, the threaded ring comprises at least one bore 47 which cuts into an outer circumferential face of the threaded ring and into which there is pressed a securing element 48. The securing element is provided in the form of a steel ball which, radially outwardly, extends over an imaginary inner circumferential face of the dish-shaped first part 14 and thus prevents the threaded ring from rotating. The threaded ring comprises a plurality of circumferentially distributed grooves 49 which can be engaged by a suitable tool which will thread the threaded ring into the dish-shaped first part 14.

All three embodiments have in common that the dish-shaped first part 14 with its base 22, its casing 23 and the flange 16 are produced so as to form one piece, with the flange 16 and the base 22—with reference to a plane extending through the axes of rotation of the differential gears 20, 21—being positioned on the same side. As a result, especially in the region of the introduction of force via the ring gear (not shown), there is achieved a particularly high degree of stiffness for the differential carrier 11. The multi-plate coupling 41 and the cover 15, with reference to said plane, are arranged on the opposite side of the flange 16 and base 22, with the multi-plate coupling 41 being axially supported against the cover 15. Because the cover 15 has been inserted into the dish-shaped first part and is axially secured by the annular securing element 17, there is achieved a relatively short length and at the same time good reinforcing conditions from the radial inside.

What is claimed is:

1. An assembly comprising:
    a differential carrier for a differential drive, which differential carrier is supported so as to be rotatingly drivable around a longitudinal axis;
    sideshaft gears which are supported in the differential carrier so as to be coaxially rotatable around the longitudinal axis;
    differential gears which are supported in the differential carrier on axes of rotation (R) positioned radially relative to the longitudinal axis and which meshingly engage the sideshaft gears; and
    a multi-plate coupling arranged in the differential carrier so as to extend coaxially relative to the longitudinal axis (A) and to be effective between a first one of the sideshaft gears and the differential carrier, or a second one of the sideshaft gears;
    wherein the differential carrier is formed of a dish-shaped part comprising a base and an integrally formed-on flange, and a cover which is inserted into the dish-shaped part and which is axially fixed by an annular securing element;
    wherein the cover and the multi-plate coupling, with reference to a plane extending through the axes of rotation (R) of the differential gears, are positioned in the differential carrier on a side located opposite the base and the flange; and
    wherein the annular securing element is a threaded ring which is turned into an inner thread in the dish-shaped part.

2. An assembly according to claim 1, wherein the threaded ring comprises at least one bore which cuts into an outer circumferential face of the threaded ring and into which there is pressed a rotation-preventing securing element.

3. An assembly according to claim 1 comprising an actuating device for actuating the multi-plate coupling.

4. An assembly according to claim 3, wherein the actuating device is arranged inside the differential carrier.

5. An assembly according to claim 4, wherein the actuating device is a differential-speed-sensing device.

6. An assembly according to claim 5, wherein a housing of the differential-speed-sensing device is at least partially formed by the cover of the differential carrier.

7. An assembly according to claim 3, wherein the actuating device is arranged outside the differential carrier.

8. An assembly according to claim 7, wherein the actuating device is a ball ramp setting device.

9. An assembly according to claim 8, wherein the ball ramp setting device is supported on a sleeve projection at the cover of the differential carrier.

10. An assembly according to claim 1, wherein the flange is arranged so as to substantially axially overlap the base of the dish-shaped part.

11. An assembly according to claim 10, comprising an actuating device for actuating the multi-plate coupling.

12. An assembly according to claim 11, wherein the actuating device is arranged outside the differential carrier.

13. An assembly according to claim 11, wherein the actuating device is arranged inside the differential carrier.

14. An assembly according to claim 13, wherein the actuating device is a differential-speed-sensing device.

15. An assembly according to claim 14, wherein a housing of the differential-speed-sensing device is at least partially formed by the cover of the differential carrier.

16. An assembly comprising:
    a differential carrier for a differential drive, which differential carrier is supported so as to be rotatingly drivable around a longitudinal axis (A);
    sideshaft gears which are supported in the differential carrier so as to be coaxially rotatable around the longitudinal axis;
    differential gears which are supported in the differential carrier on axes of rotation (R) positioned radially relative to the longitudinal axis and which meshingly engage the sideshaft gears; and a multi-plate coupling arranged in the differential carrier so as to extend coaxially relative to the longitudinal axis (A) and to be effective between a first one of the sideshaft gears and the differential carrier, or a second one of the sideshaft gears wherein the differential carrier is formed of a dish-shaped part comprising a base and an integrally formed-on flange, and a cover which is inserted into the dish-shaped part and which is axially fixed by an annular securing element, wherein the cover and the multi-plate coupling, with reference to a plane extending through the axes of rotation (R) of the differential gears, are positioned in the differential carrier on a side located opposite the base and the flange; and wherein the annular securing element is a locking ring which is positioned in an annular groove in the dish-shaped part.

* * * * *